(12) United States Patent
Ausbeck, Jr.

(10) Patent No.: US 6,975,302 B1
(45) Date of Patent: Dec. 13, 2005

(54) ISOMETRIC JOYSTICK USABILITY

(75) Inventor: Paul J. Ausbeck, Jr., Campbell, CA (US)

(73) Assignee: Synaptics, Inc., San Jose, CA (US)

( * ) Notice: Subject to any disclaimer, the term of this patent is extended or adjusted under 35 U.S.C. 154(b) by 840 days.

(21) Appl. No.: 09/888,206

(22) Filed: Jun. 22, 2001

Related U.S. Application Data

(60) Provisional application No. 60/213,855, filed on Jun. 23, 2000.

(51) Int. Cl.$^7$ .............................................. G09G 5/08
(52) U.S. Cl. ..................................... 345/161; 345/157
(58) Field of Search ............................... 345/156–184; 273/148 B

(56) References Cited

U.S. PATENT DOCUMENTS

| | | | |
|---|---|---|---|
| 3,863,098 A * | 1/1975 | Mehr | 315/367 |
| 4,386,346 A | 5/1983 | Levine | 340/709 |
| 5,565,887 A * | 10/1996 | McCambridge et al. | 345/856 |
| 5,570,111 A | 10/1996 | Barrett et al. | 345/157 |
| 5,680,154 A | 10/1997 | Shiga et al. | |
| 5,696,535 A | 12/1997 | Rutledge et al. | 345/156 |
| 5,742,278 A * | 4/1998 | Chen et al. | 345/156 |
| 5,764,219 A | 6/1998 | Rutledge et al. | 345/159 |
| 5,912,659 A | 6/1999 | Rutledge et al. | 345/156 |
| 5,945,979 A * | 8/1999 | Rutledge et al. | 345/161 |
| 5,973,668 A * | 10/1999 | Watanabe | 345/157 |
| 6,184,867 B1 * | 2/2001 | Kandogan et al. | 345/161 |
| 6,388,655 B1 * | 5/2002 | Leung | 345/157 |
| 6,717,568 B1 * | 4/2004 | Takatuka et al. | 345/156 |

* cited by examiner

*Primary Examiner*—Xiao Wu
*Assistant Examiner*—M. Fatahiyar
(74) *Attorney, Agent, or Firm*—Ingrassia Fisher & Lorenz, P.C.

(57) ABSTRACT

A ballistics subsystem is coupled to a force sensor of an isometric input device. The ballistics subsystem augments control by applying a dual gain transfer function that smoothly transitions from separate gain factors for low and high force inputs. When applied in a cursor device, such as a joystick or force pad, pointer movement is coupled to input force, not input displacement. Traditionally, an array of miniature strain gauges is used to measure the input force. A more recent method optimized for very low cost uses an array of capacitive sensors. Regardless of what physical mechanism is used to measure input force, customized algorithms are generally used to establish the feel and usability of an isometric joystick. The invention comprises several new methods for optimizing the use of an isometric joystick as a cursor-positioning device, altering the transfer function gain to take advantage of asymmetry, detecting selection and deselection, and combined selection and deselection. A method is also described to perform real time suppression of unwanted cursor motion related to selection.

52 Claims, 11 Drawing Sheets

ISOMETRIC JOYSTICK USABILITY

CROSS REFERENCE TO RELATED APPLICATIONS AND CLAIM OF PRIORITY

This invention claims priority to the following co-pending U.S. provisional patent application, which is incorporated herein by reference, in its entirety:

Paul J. Ausbeck, Jr., Provisional Application Ser. No. [60/213,855], entitled "ISOMETRIC JOYSTICK USABILITY," filed, Jun. 23, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention relates to using an isometric joystick to move the cursor on a computer screen and to produce button events for the computer's operating system.

BACKGROUND OF THE INVENTION

One common feature of the modern computer interface is a mechanism for moving a cursor or pointer across the computer's display. For stationary computers the "mouse" is the most common pointing mechanism. A related role for the mouse is to provide a method for attaching importance to certain pointer locations. Accordingly, mice universally provide at least one button to perform this task.

Because of space and weight constraints, portable "laptop" or "notebook" computers often use a miniature isometric joystick in the role of a pointing device. FIG. 1 shows an isometric joystick 100 manufactured by Synaptics, Inc. When installed in a computer, the lower portion 110 of the joystick is hidden below the computer's keyboard with the nub 120 typically protruding between the "G" and "H" keys.

The three dimensions in which the joystick conventionally measures input force are labeled on the axis 130 shown in FIG. 1. Force in the xy plane parallel to the work surface is used to position the cursor. Force in the direction perpendicular to the work surface, z, is used to perform selection operations analogously to those performed by the primary mouse button.

PRIOR ART

The isometric joystick with the largest commercial success to date is the TrackPoint system from IBM Corporation. Currently, there are at least four patents that relate to improving the usability of the TrackPoint system. Two are related to optimizing pointer movement and two are associated with synthesizing selection operations.

Parabolic-Sigmoid Transfer Function

U.S. Pat. No. 5,764,219 argues that the optimal transfer function to tie input force to cursor movement is parabolic-sigmoid or S shaped. The trace labeled "transfer function" in FIG. 2 is an abstract S shaped transfer function. The key aspects of this shape are the two relatively flat regions sandwiched around a region of nonlinearly increasing response.

At low input forces the output of the S transfer function is also low allowing precise pointer movement. For larger forces pointer movement speed is high and fairly constant over a wide range of inputs. Ostensibly, this allows the user to develop a more accurate estimate of pointer speed during large movements. A more accurate speed estimate is postulated to help reduce target overshoot.

One problem with the S transfer function is that its derivative is zero at minimum and maximum force values. The shape of the derivative of S is shown by the trace labeled "derivative" in FIG. 2. The first zero in the derivative of S introduces a significant lag between initial application of small forces and perceptible pointer movement. At the other end, the possibility of target overshoot is increased due to the lag between decreased input force and decreased pointer velocity.

Negative Inertia

One attempt to compensate for pointer lag is the so-called "Negative Inertia" transfer function disclosed in U.S. Pat. No. 5,570,111. The basic S shaped transfer function $$O_n = S(F_n) \qquad (1)$$

of U.S. Pat. No. 5,764,219 is augmented with a term that is proportional to the time derivative of input force. If G is defined as the gain applied to the time derivative term, the difference equation formulation of the negative inertia transfer function is:

$$O_n = S(F_n + G \cdot (F_n - F_{n-1})) \cdot \frac{F_n}{F_n + G \cdot (F_n - F_{n-1})}. \qquad (2)$$

The primary effect of negative inertia is to provide a response boost that makes the cursor speed up and slow down faster, thus compensating for the lag introduced by the S transfer function. The response boost is somewhat limited, however, since it is based upon the time derivative of the input and only comes into play when input force is changing relatively rapidly.

In the preferred negative inertia embodiment, G is actually larger than one. Since the output of the S transfer function is not defined for negative inputs, when a negative input occurs, S is applied to the magnitude of its argument and the sign of the output is reversed. This procedure allows for reverse motion or pointer "snap back" when input force rapidly decreases.

A significant problem with negative inertia is that the amount of reverse motion is very difficult for a human operator to control. Rather than accomplishing the intended task of immediately hitting small targets following large cursor movements, it may lead to undesired pointer motion just as the operator is fine-tuning the cursor's position. An additional complication of the large value of G is that input noise may be amplified enough to add noticeable jitter to a slowly moving cursor. The preferred negative inertia embodiment incorporates an additional input force deadband to avoid this problem. This extra deadband is quite ironic in that one of the primary objectives of negative inertia is to ameliorate sluggish cursor acceleration.

Selection with Motion Correction

The key problem that must be solved in order to perform selection with an isometric joystick is to separate selection information from the predominant movement information. Selection information is naturally associated with z axis and movement information with the xy plane. However, since x and y forces are produced frictionally some movement information leaks into the selection axis and vice versa.

To overcome this inherent ambiguity, the particular force maneuvers that indicate selection must be carefully designed. The selection signature used in the IBM TrackPoint pointing system involves both the absolute value of z and its rate of change. The details are disclosed in U.S. Pat. No. 5,696,535 and the selection signature figure from that patent is reproduced in FIG. 3.

TrackPoint selection occurs when both z 300 and the first time derivative of z 310 simultaneously exceed customizable thresholds. Deselection occurs when both z and dz/dt simultaneously drop below customizable thresholds. On FIG. 3 the z selection threshold and the dz/dt selection threshold are labeled "2" and "1" respectively. The deselection thresholds are labeled "2" and "3".

The TrackPoint selection signature becomes increasingly immune against spurious selection as z and dz/dt thresholds are increased. However, robust selection requires z and dz/dt values that are large enough that the average user causes significant pointer motion during selection operations. For this reason the TrackPoint system also includes the ability to store and later unwind pointer motion that occurs during selection or deselection.

This technique, called motion correction, is illustrated in block diagram form in FIG. 4. The basic idea is to introduce a sufficient store of input samples to encompass the largest expected selection operation. When selection is detected, the input store is scanned backward to locate the start of the selection operation. Motion occurring between the start and end of the selection operation is reversed, the effect being that when selection occurs the pointer jumps back to the position it occupied just before initiation of selection. Correction is applied on deselection as well.

One drawback of motion correction is that the process of moving the cursor and then unwinding the motion can be visually distracting or even annoying. A further complication is that storing and examining past force measurements can create implementation difficulties. This is especially an issue for portable devices where memory and computational resources may be at a premium.

Multiple Selection with Motion Correction

In U.S. Pat. No. 5,912,659 selection with motion correction is extended to encompass multiple possible selection operations. The basic selection signature remains the same but when selection is detected, motion information in the correction buffer is used to disambiguate from among a number of possible selection operations.

FIG. 5 shows the top view of a sphere in the vector space defined by the x, y, and z forces accumulating during a selection operation. The polar cap, labeled z on the figure, represents the normal selection operation. In this region, the force vector that accumulates during selection lies very close to the z axis.

The annulus surrounding the polar cap represents the region where accumulated xy forces are significant but still substantially less than those in the z direction. The annulus can be split into one ore more angular regions to define multiple selection operations. For example, the region labeled z-y represents an accumulated force vector that lies mostly in the z direction but also contains a significant component in the negative y direction.

The region labeled xy represents accumulated vectors that are more planar than vertical. Since these vectors are likely due to motion alone, selection operations that accumulate vectors in this region are quashed.

While an interesting idea, multiple selection is difficult to master for a significant user population. The most important contribution of the patent is the idea of examining the correction buffer for additional clues to help discriminate selection from intended motion.

Motivation for the Present Invention

The present inventor has realized that, taken as a whole, the IBM TrackPoint System is fairly complex and can be quite difficult for a novice user to master. The S transfer function allows for reasonable fine-grained and coarse pointer movement but acceleration and deceleration can be perceived as sluggish. This is ameliorated somewhat by negative inertia but the increased sensitivity makes it difficult to perform selection operations without incurring significant pointer motion. Furthermore, unwinding motion that occurs during selection leads to unpleasant extraneous pointer motion and can be relatively expensive to implement.

Therefore, the present inventor has realized the need for a simpler system for optimizing pointer movement and selection operations performed by an isometric joystick. In addition to providing for efficient pointing and selection, the system should be easy for a computer operator to learn, avoid extraneous pointer motion, and allow for straightforward implementation.

SUMMARY OF THE INVENTION

The invention comprises an improvement in the usability of an isometric joystick when used as a pointing device controlling a computer display cursor. The invention improves pointing performance and selection.

The present invention includes a device that uses at least one of a plurality of dual-gain transfer functions to provide improved pointing efficiency. These transfer functions have in common a low gain that is applied to relatively small input forces and a higher gain that is applied to relatively larger forces. The preferred function is continuous in the first derivative and provides for smoothly increasing pointing gain as input force increases. Pointing gain is relatively constant for both small and large input forces and adjusts between the two extremes in a manner that minimizes sluggish pointer feel. The preferred transfer function has two terms, a low gain that is continuously applied and a higher gain that is blended multiplicatively as force increases using an S shaped blending function.

The invention includes a method for suppressing the high gain portion of a dual-gain transfer function. This method exploits the limited human ability to control the rate of decrease of applied joystick force. Except for relatively slow rates of decrease from relatively low applied force levels, motion accumulated from decreasing forces is almost never desired. The present invention minimizes this undesired motion by suppressing the high gain term of a dual-gain ballistics function during periods of decreasing pointing force. Unintended motion near the end of coarse movements is decreased while fine-grain motion is undisturbed.

The invention includes methods for performing selection and deselection using an isometric joystick are provided. Novel selection and deselection signatures lead to selection discovery procedures that require only a single scalar register for holding state. Additionally, a customized combined selection/deselection signature is provided for separating intended pointer motion from tapping operations. An adjunct mechanism allows for smoothly decreasing selection sensitivity as applied forces deviate from the purely vertical.

The invention also includes a final disclosure is a method for suppressing motion that would otherwise occur during selection and deselection operations. Since human operators almost never intend for motion to occur during periods of relatively rapidly decreasing z force, as occurs during deselection, motion occurring at such times is discarded. Further, only motion produced by forces that lie relatively close to the xy plane is allowed during the periods of relatively rapidly increasing z force that are characteristic of selection operations. Discarded motion that is not associated with an actual selection or deselection operation remains unnoticeable.

DETAILED DESCRIPTION OF THE INVENTION

Pointer Motion Ballistics

In classical ballistic motion, a projectile with an initially applied momentum moves under the influence of static external forces such as gravity or relatively static forces such as air resistance. The required initial velocity of a ballistic projectile is calculated by working back from the desired target and applying all the expected forces that occur along the path. In contrast, the trajectory of the pointer on a computer display is the result of both an initial velocity and continuous monitoring and adjustment by the human operator. Despite this nomenclature conflict, the algorithms that relate pointer motion to user input are typically called ballistics algorithms.

Figure 1:
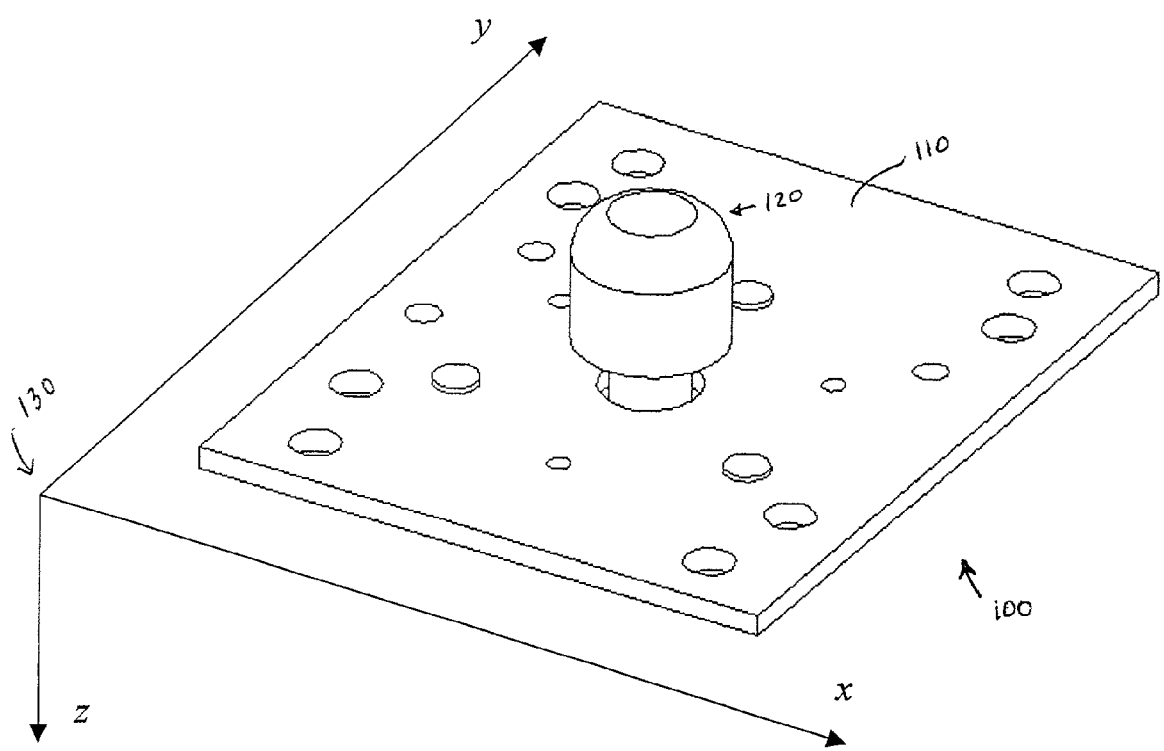
FIG. 1 shows an isometric joystick with the conventional labeling of input variables.
Figure 2:
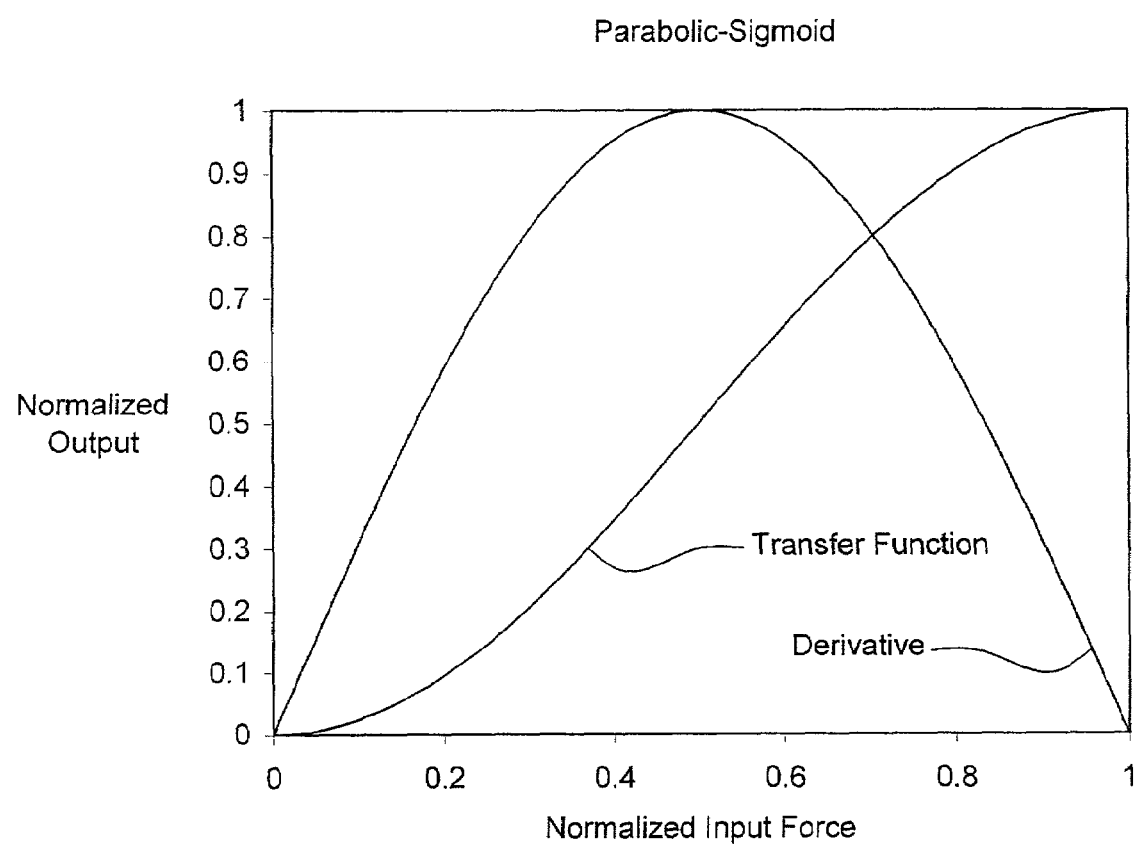
FIG. 2 shows the abstract form of a parabolic sigmoid transfer function used in the IBM Trackpoint isometric joystick system.
Figure 3:
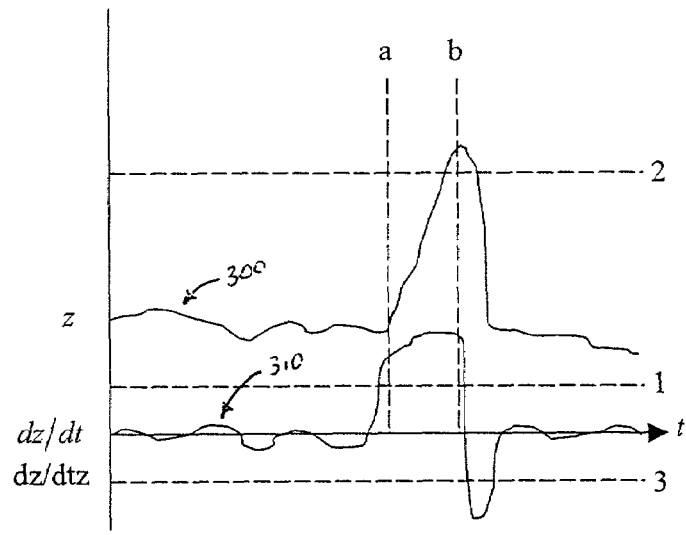
FIG. 3 shows the selection signature used in the IBM Trackpoint isometric joystick system.
Figure 4:
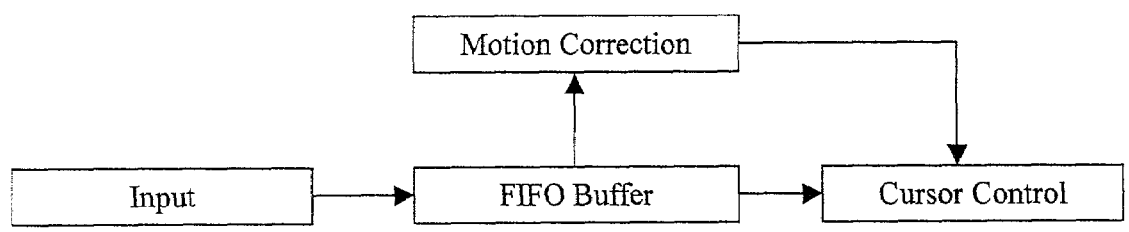
FIG. 4 is a block diagram of the cursor motion correction apparatus used in the IBM Trackpoint.
Figure 5:
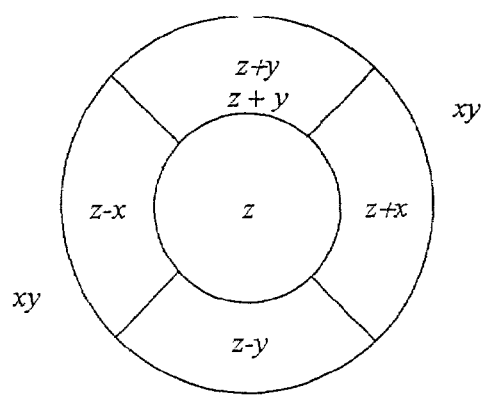
FIG. 5 shows the multiple selection criteria of U.S. Pat. No. 5,912,659.
Figure 6:
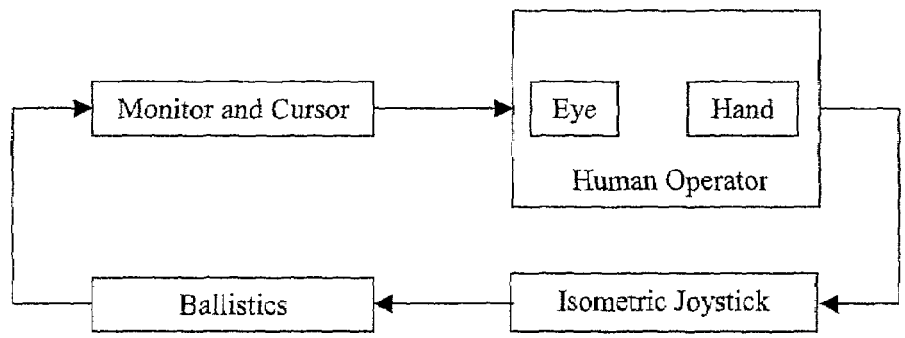
FIG. 6 is a block diagram of a closed cursor motion control loop of an isometric joystick.

A block diagram of elements involved in moving a pointer on a computer display is shown in FIG. 6. Pointer motion is accomplished via a classic closed loop feedback control system. The operator puts force on the joystick. This force is translated into motion reports to the computer by the ballistics subsystem. The computer operating system then moves the pointer on the monitor. The operator observes the trajectory of the pointer and modifies the input force to more optimally approach the target.

Because of this closed-loop aspect of the pointer system the chief requirement placed on the ballistics algorithms is that the transfer function must be easily learnable by the human operator. Subject to this constraint then, the ballistics transfer function must provide for both fine-grain and gross movements of the pointer as efficiently as possible. These two constraints lead to the following thesis to describe the ideal transfer function:

The ballistics transfer function must be as smooth and simple as possible subject to the constraint that fine grain and gross movement must both be efficiently accommodated.

Dual-Gain Transfer Function

The force sensor in an isometric joystick is typically designed so that its output is linearly proportional to input force. While a linear output is ideal for mass-producing sensors with a standardized characteristic, it is inadequate to provide efficient pointing. The constant of proportionality chosen for relating input force and pointer motion leaves either fine-grained or gross motions inadequately served. For this reason, the present invention augments the output of the force sensor with a ballistics subsystem that alters the basic linear characteristic to one especially optimized for the pointing task.

The ballistics subsystem operates in a sampled environment. The output of the force sensor is sampled periodically and the force sample, $F_n$, is transformed into $M_n$ mickeys (a mickey is a unit that describes a minimum amount of pointer movement) of pointer motion using a ballistics function:

$$M_n = B(F_n). \tag{3}$$

Figure 7:
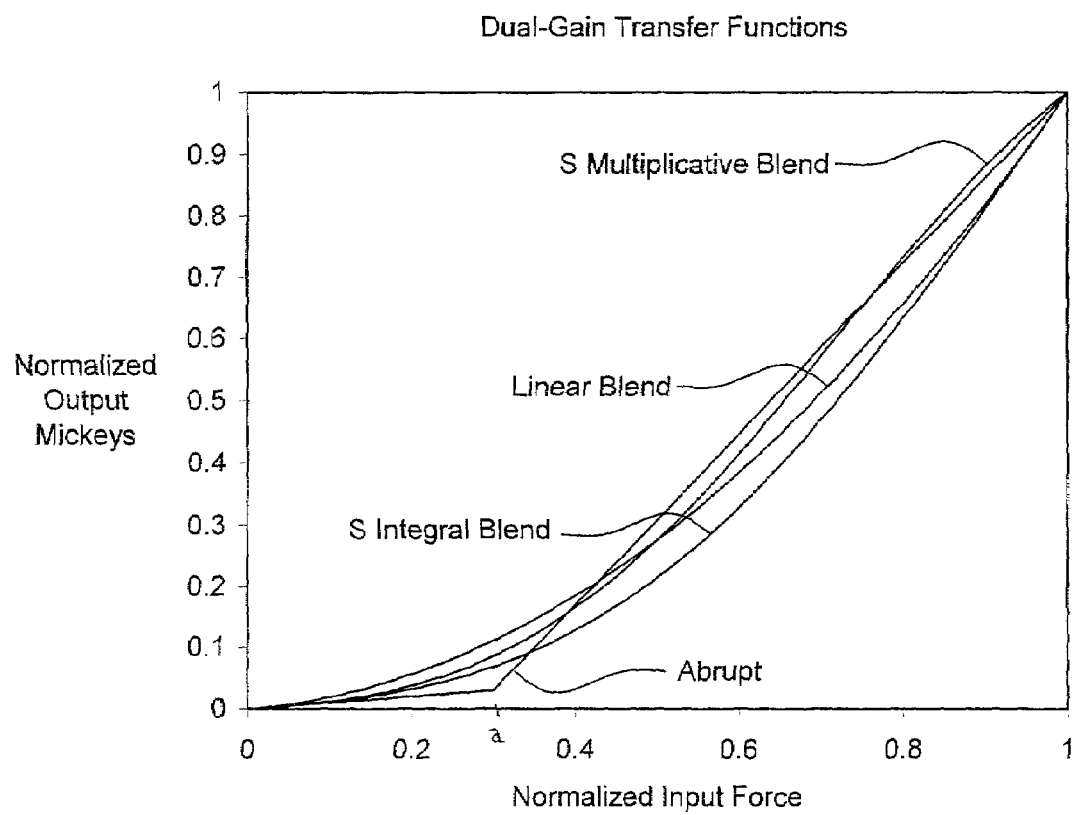
FIG. 7 is a graph of several possible dual-gain transfer functions in accordance with the present invention.

While the ballistics function is not linear, it is useful to define the instantaneous slope or derivative of the ballistics function as its gain. To accommodate fine-grained motion, the ballistics gain is set low. High gain is used to accommodate coarse movements. The simplest way to accommodate both tasks is with a transfer function with two gains: a low gain, L, applied when forces are small and a high gain, H, applied to larger forces. Several possible dual-gain transfer functions are shown in FIG. 7.

Abrupt Gain Transition

The simplest dual-gain transfer function is one with an abrupt transition between the low and high gain portions of its characteristic. In difference equation form this can be written as:

$$M_n = L \cdot F_n + H \cdot \Phi(F_n - a) \cdot (F_n - a), \tag{4}$$

where a is the input force above which high gain is applied and $\Phi$ is an abstract step function which takes on a value of zero when $F_n$ is less than a and one otherwise. Note that in this formulation low gain is also applied above the transition point. Since L is typically much smaller than H, this term does not contribute significantly to the high gain output. In any case, H can simply be defined as the difference between the required coarse movement gain and L. The trace labeled "Abrupt" on FIG. 7 has a gain transition point at 30% of the maximum input force.

Blending

While the abrupt dual-gain ballistic does provide for good fine-grain and coarse pointer motion it is not ideal for movements that lie between the two extremes. For medium-grain movements the kink in the gain characteristic may become noticeable and any noticeable artifact in the pointing apparatus tends to detract from efficient pointing. To eliminate noticeable artifacts, the transfer function must be "smooth". The smoothness of a mathematical function is related the number of its derivatives that are continuous. The first derivative of the abrupt dual-gain transfer function is plotted in FIG. 8. As can be seen there is a large discontinuity in the derivative at a (Note "a" in FIGS. 7 and 8).

One way to create a transfer function with a continuous first derivative is to smoothly blend in the higher gain as force increases:

$$M_n = L \cdot F_n + H \cdot B(F_n) \cdot F_n. \quad (5)$$

The simplest such function that is smooth is the linear blending function:

$$B(F_n) = B \cdot F_n, \quad (6)$$

which when substituted into (5) results in:

$$M_n = L \cdot F_n + H \cdot F_n^2. \quad (7)$$

Figure 8:
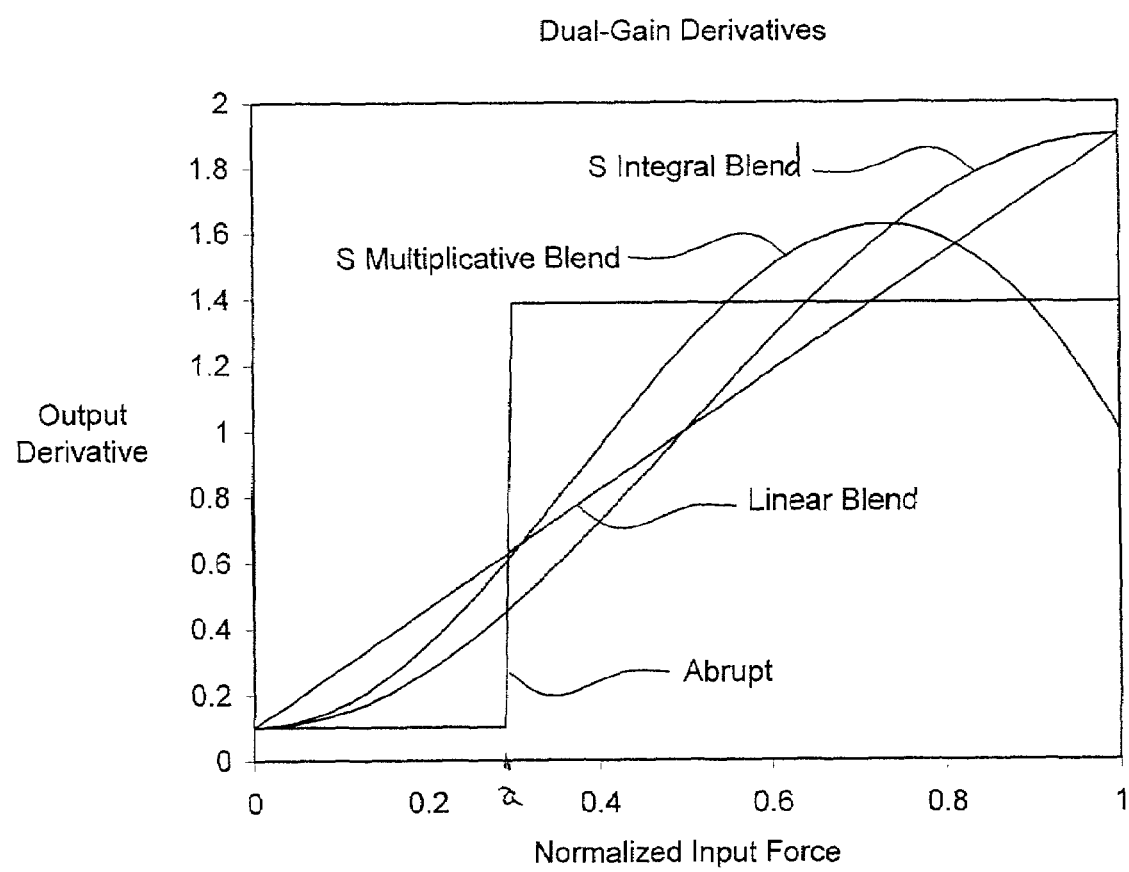
FIG. 8 is a graph of derivatives of the transfer functions of FIG. 7.

The curve labeled "linear blend" on FIG. 7 is a plot of this transfer function. Its derivative, shown in FIG. 8, is linear and therefore continuous as desired. However, the gain rises fairly quickly from L as force increases and this can slightly degrade fine-grained pointing. Further, the gain is not at all constant at larger forces. Therefore gross movements are slightly less efficient as the operator never gets a good estimate of the coarse-grained gain.

A better gain characteristic should delay the onset of increasing gain and then more rapidly increase it to a more constant level. This is similar to the familiar S curve, not as the transfer function but as its derivative instead! The transfer function with initial gain, L, and having gain increase as S is $$M_n = L \cdot F_n + H \cdot \int S(F_n). \quad (8)$$

This transfer function and its derivative are plotted on FIG. 7 and FIG. 8 as the traces labeled "S Integral Blend".

The S integral blend transfer function improves upon the linear blend but the gain does not become constant until very near the high end of the input force range. More importantly, the blending and input force components of the high order gain term are not separable. This can create problems when applying the function to signed values of input force and can cause anisotropic pointing behavior when the transfer function is independently applied to both the x and y input forces.

A nice way to solve both problems is to use the S function to blend multiplicatively:

$$M_n = L \cdot F_n + H \cdot S(F_n) \cdot F_n. \quad (9)$$

This transfer function and its derivative are plotted on FIG. 7 and FIG. 8 as the traces labeled "S Multiplicative Blend".

The S multiplicative blend characteristic is a nice synthesis of all the required properties for good pointing efficiency. Its first derivative is continuous. Its gain does not increase too rapidly in the low force regime. Its gain smoothly climbs as input force increases and is relatively constant in the high force regime. This last property is particularly noticeable on FIG. 7 since for relatively large input forces it is somewhat difficult to distinguish the dual gain and abrupt characteristics.

Isotropic Motion

A significant problem with applying a non-linear gain to a vector in the xy plane is that if gains are independently applied to each vector component, the direction of the vector may be changed as well as the magnitude. One way to eliminate this problem is to use the magnitude of the raw input vector to select the gain. The magnitude of a two dimensional vector is the square root of the sum of the squares of each component, as shown in Equation 10, for example.

$$R_n = \sqrt{x_n^2 + y_n^2}. \quad (10)$$

An approximation of vector magnitude that allows for a basic implementation is:

$$R_n = |x_n| + |y_n| - \frac{2 \cdot |x_n|}{3} \quad (11)$$

if $|x_n| \leq |y_n|$, and $$R_n = |x_n| + |y_n| - \frac{2 \cdot |y_n|}{3} \quad (12)$$

otherwise.

If the gain and force terms in a dual-gain transfer function are separable, then the ballistics transformation can be made isotropic by using R in the blending term:

$$M_n = (L + H \cdot B(R_n)) \cdot F_n. \quad (13)$$

Of the previously described transfer functions, the abrupt, linear blend, and S multiplicative blend transfer functions are all separable. Their isotropic forms are:

$$M_n = (L + H \cdot \Phi(R_n - a)) \cdot F_n, \quad (14)$$

$$M_n = (L + H \cdot R_n) \cdot F_n, \quad (15)$$

and $$M_n = (L + H \cdot S(R_n)) \cdot F_n \quad (16)$$

respectively.

Control Asymmetry

One fundamental aspect of using an isometric joystick to affect pointer movement is that the human operator can much more finely control an increase in the magnitude of the input force than a decrease. This difficulty in controlling decreasing force becomes more and more pronounced as the magnitude of the force increases. For instance, motion accumulated during decreasing force intervals may have some vague correlation to the operator's actual intent when very fine movements are performed. However, motion accumulated during the rapid decrease in force that occurs at the end of a gross movement is almost never desired.

Because the dual-gain transfer function can be implemented with two distinct gains, the asymmetry in pointer control allows for a simple compensation mechanism for target overshoot after large movements. The mechanism is to drop high gain motion that accumulates during decreases in R. For instance, the S multiplicative blend transfer function remains as before:

$$M_n = L \cdot F_n + H \cdot S(R_n) \cdot F_n \quad (17)$$

if $$\frac{dR}{dt} \geq T_1$$

Figure 9:
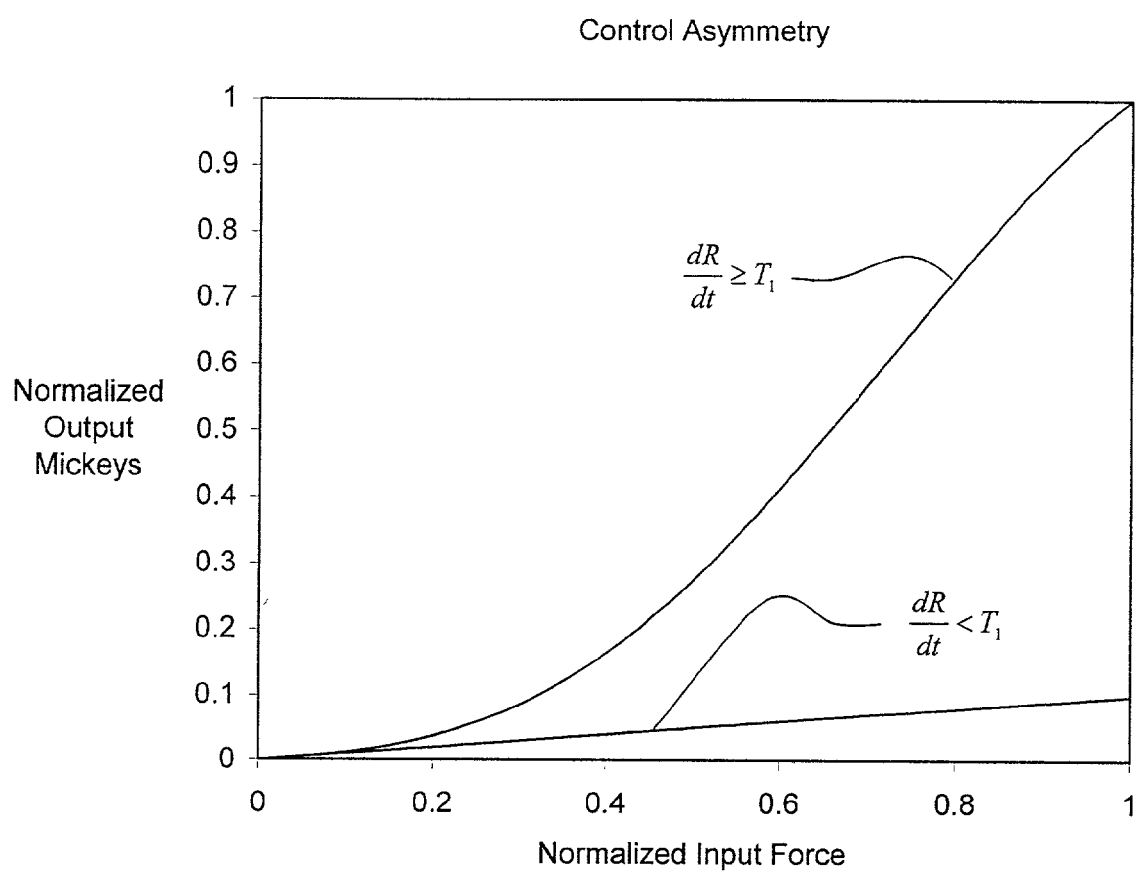
FIG. 9 is a graph of Normalized Input Force vs. Normalized Output Mickeys illustrating how gain is selected to take advantage of control asymmetry.

($T_1$ zero or slightly negative) and simplifies to $$M_n = L \cdot F_n \quad (18)$$

otherwise. Use of this procedure with the S multiplicative blend transfer function is illustrated in FIG. 9.

Altering the value of the asymmetry constant, $T_1$, can vary the selectivity of the gain switch. Note how this mechanism leaves fine-grain pointing completely undisturbed.

Fractional Mickey Accumulation

If the smallest resolvable force is assigned a single mickey of pointer motion, the smallest non-zero pointer velocity available from an isometric joystick pointing system is simply the sample rate. For example, if T is the system sample rate, then T mickeys/s is the smallest non-zero pointer velocity. The typical sample period of 10 ms yields a smallest non-zero pointer velocity of 100 mickeys/s, far larger than that useful for fine grain movement.

A related problem with joystick pointing systems is input noise. If the smallest resolvable force is set large enough so that a quiescent joystick never indicates motion, the resulting deadband around zero force results in perceptible pointer sluggishness. Both of these problems can be solved using the method of fractional mickey accumulation.

With fractional mickey accumulation the smallest resolvable force is assigned some fraction of a mickey that is less than one. Mickeys accumulate until such time as a least a single mickey is available. At that time the integral number of mickeys is reported to the operating system and the residual fraction is retained. Remarkably, this mechanism acts as a non-linear low pass filter whose passband is relatively small for small inputs and relatively large for large inputs. This is a very close to optimal solution for the input noise problem.

Gain Adjustment

The dual-gain transfer function allows for independent adjustment of H and L. However, a single variable gain factor provides good pointer feel across a wide variety of motion sensitivities. Normalizing the fine-grain gain to one, the S multiplicative blend transfer function can be recast in adjustable form as:

$$M_n = G_f(F_n + H \cdot S(R_n) \cdot F_n), \quad (19)$$

where $G_f$ is an adjustable gain factor and H is a fixed factor larger than the normalized fine-grain gain.

Selection Operations

Selection is a mechanism for using z force on an isometric joystick to synthesize presses and releases of what would otherwise be the computer's primary mouse button. The selection subsystem continually analyzes input force variables looking for particular patterns that emulate mouse button events. The pattern that indicates that a button down event should be synthesized is called the selection signature. The corresponding pattern that synthesizes a button release is called the deselection signature.

Often a mouse button is pressed and released in rapid succession. The shorthand term for this is a mouse button click. A mouse button click can be naturally emulated via a tap on an isometric joystick. The input force pattern that emulates a mouse button click is called the tap signature. Because a tap can be seen as selection followed rapidly by a deselection, a specialized tap signature is not a requirement for generating button click events. However, the additional temporal information inherent in a tap can be used to more robustly discriminate between motion and intended taps.

Selection Signature

A natural method for a human operator to signal selection is to apply an increasing z force simultaneously with the relative absence of xy force. To detect this selection signature it is sufficient to examine the input force variables only when z is increasing sufficiently rapidly. During these periods of increasing z, two distinguishing criteria must be met. First the total amount of z force applied must reach a certain minimum threshold. Second the total amount of xy force applied must be substantially less than the z total.

A simple mechanism for keeping track of the force applied during periods of increasing z is to accumulate a force vector, V, in the dimensions of z and R, where R is the previously described magnitude of the xy input force. The difference between the z and R components of V is a good indication of the extent to which both a substantial z force and an insubstantial xy force has been applied. An example selection signature is illustrated graphically in FIG. 10.

If instead of separately accumulating both components of V the difference is accumulated, a single scalar parameter suffices to track the selection signature. Defining A as the scalar selection parameter, its accumulation can be written in difference equation form as:

$$A_n = A_{n-1} + (z_n - R_n). \quad (20)$$

Selection occurs when A exceeds a configurable threshold, $T_3$. By accumulating A only when $$\left|\frac{dz}{dt}\right|$$

exceeds a configurable threshold, $T_2$, and by zeroing A when $$\left|\frac{dz}{dt}\right|$$

meets or drops below $T_2$, A will always contain information from a single potential selection action.

Selection signature discovery is summarized as follows:
1. If $$\left|\frac{dz}{dt}\right| > T_2$$

accumulate the scalar difference of the components of V in A.

2. If $$\left|\frac{dz}{dt}\right| <= T_2$$

reset A.

3. If A>=$T_3$ indicate selection.

Selection Detuning

Figure 11:
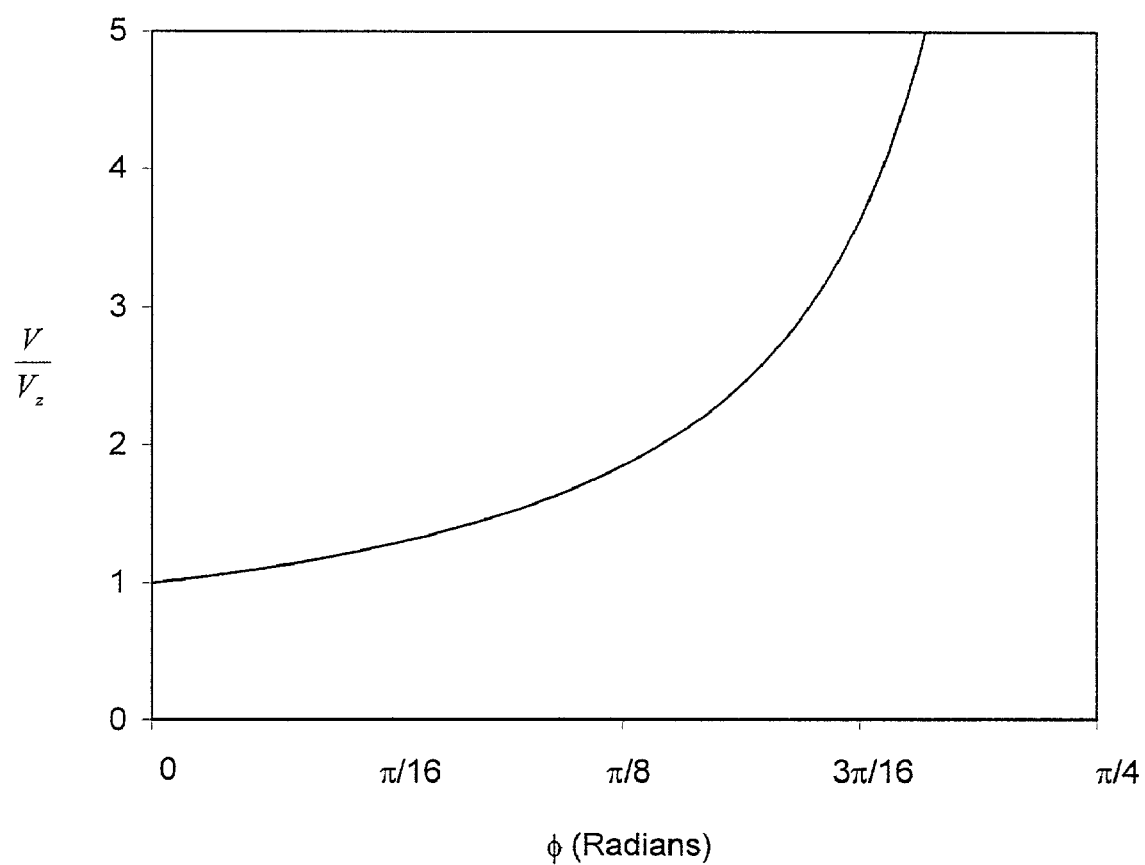
FIG. 11 is a graph illustrating how selection is detuned as the direction of applied force moves away from the z axis.

The just described selection signature discovery method has the property of being more sensitive to completely vertical presses and increasingly less sensitive to presses that deviate from vertical. This detuning property is completely smooth. Defining φ as the angle that the accumulating force vector makes with the z axis, the relative immunity of the of the selection signature discovery process to forces applied at various angles is plotted in FIG. 11. When φ is zero, as for a completely vertical press, the normalized force that must be applied is $T_3$ units. As φ increases the force that must be applied to indicate selection increases more and more quickly. At φ of approximately 30° the sensitivity has been reduced by a factor of five. For φ of 45° or greater, selection is impossible.

The preferred selectivity in discriminating between motion and selection varies from operator to operator. This need can be met by allowing customized adjustment of $T_3$. As $T_3$ is increased not only is more z force required to indicate selection, but the direction of application must be increasingly aligned with the z axis. Therefore, users that require extreme immunity to spurious selection can be accommodated without requiring an unduly large selection force.

Deselection Signature

Two factors make discrimination of deselection a streamlined operation. First, deselection can only occur from the selected state. Second, because of the stateful nature of deselection, a rapid decrease in z, $$\frac{dz}{dt} < T_4,$$

can be arbitrarily used as the deselection criterion. Computer operators can easily learn to avoid rapid decreases in z while the pointer is in the selected state.

Figure 12:
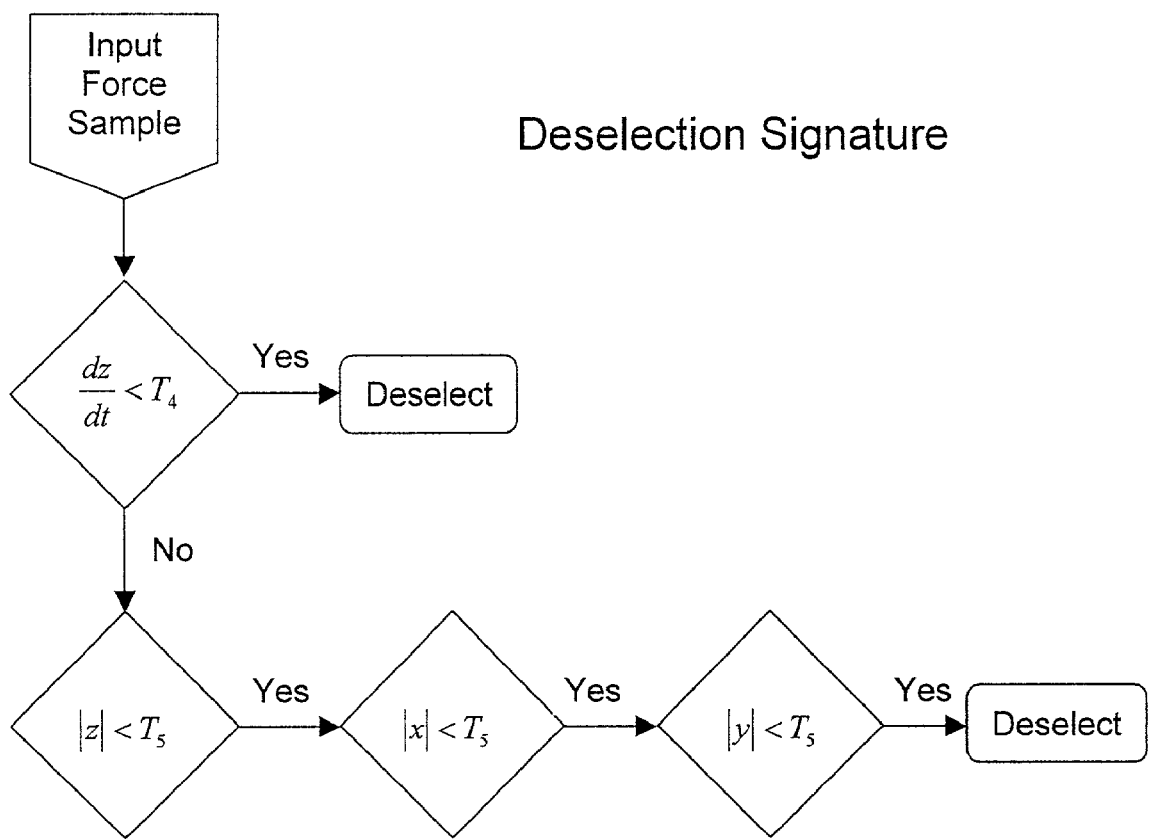
FIG. 12 is a flow chart illustrating a deselection signature process according to an embodiment of the present invention.

However, using rapidly decreasing z as the only deselection criteria may allow for the slow removal of the finger from the joystick while retaining the selected state. To avoid this, deselection is also triggered by removal of the finger from the joystick. This is indicated by the magnitudes of x, y, and z simultaneously falling below a customizable threshold $T_5$. An example embodiment of the deselection signature discovery process is shown in FIG. 12.

Tap Signature

A light tap on an isometric joystick is a natural way for a human operator to emulate a mouse button click. However, if a tap is light and quick enough, separate selection and deselection signatures can fail to detect it. The reason is that an accumulated z force threshold that is tuned for discriminating selection from motion is often not reached during the short period of increasing z that occurs during a tap. This problem can be solved by taking advantage of additional signature information peculiar to tapping actions.

In a tap gesture, a rapid increase and rapid decrease in z occurs within a certain maximum time window. Further, the amount of motion occurring during a tap is conventionally quite small. By adding these constraints to the tap signature the minimum z threshold that must be attained can be reduced to a value that is comfortably attained when tapping.

Figure 13:
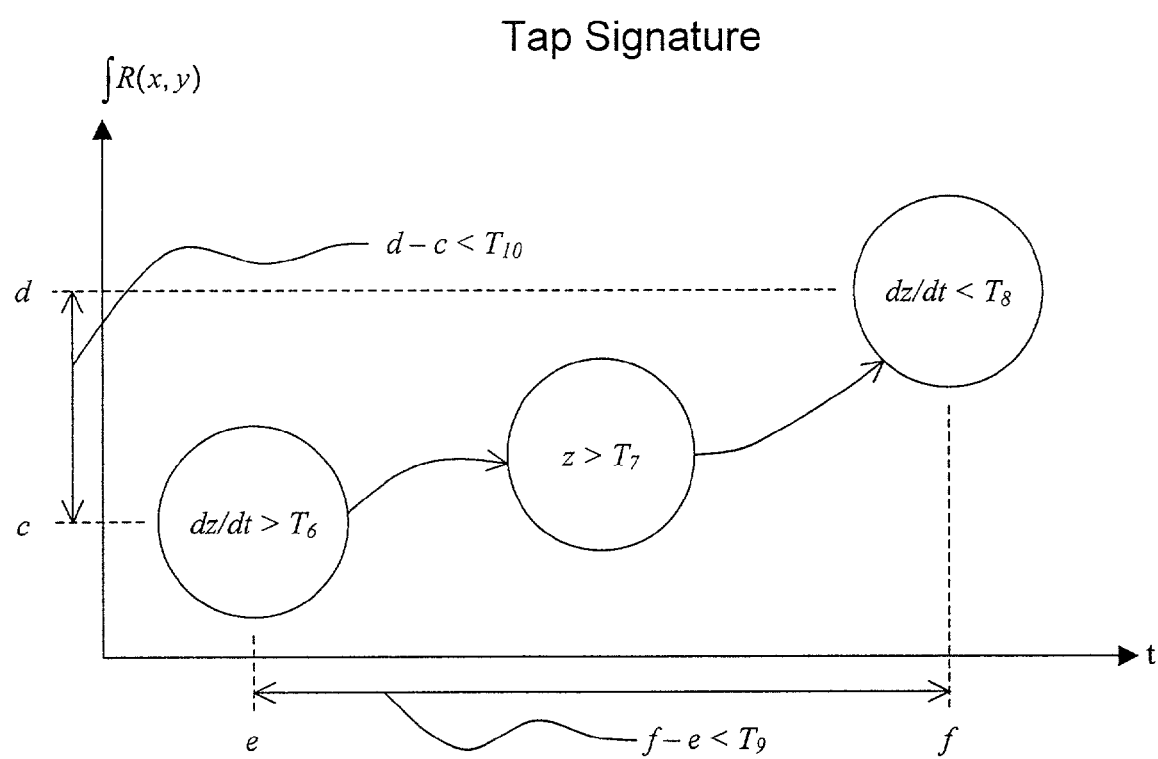
FIG. 13 is a diagrammatic illustration of a tap signature process according to an embodiment of the present invention.

An example tap signature discovery procedure that works well in practice is shown in FIG. 13. First a period of relatively rapidly increasing z, $$\frac{dz}{dt} > T_6,$$

must be detected. During this period of increasing z, a minimum z threshold, z≧$T_7$, must be attained. A relatively rapid decrease in z, $$\frac{dz}{dt} < T_8,$$

must then occur. The additional filter is that all three of these events must occur within a time window, $T_9$, and that motion that accumulates between the detection of rapidly increasing and rapidly decreasing z must be less than a threshold, $T_{10}$.

Motion Suppression

Rather than unwinding it after the fact, the best way to avoid cursor motion during selection and deselection should be to suppress such motion as it occurs. Of course this can only be effective if it is possible to quash motion that is potentially associated with selection without interfering with pointer movement. Surprisingly, while transparently avoiding all selection motion is quite difficult, some uncomplicated techniques can avoid enough motion so that selection and deselection are reliably located.

One advantage of the selection and deselection signatures described in the previous sections is that selection criteria are only developed during periods of relatively rapidly changing z. During selection, z increases and during deselection z decreases.

Suppression of unwanted deselection motion is quite straightforward. Relatively large decreases in z almost never occur in conjunction with legitimate pointer motion. Deselection motion can be largely eliminated simply by suppressing motion that occurs during periods of relatively rapidly decreasing z.

During all periods of relatively rapidly increasing z, pointer motion can potentially occur. Ideally, this motion should be suppressed only if selection actually occurs, but allowed otherwise. This is of course arguably impossible to do exactly as the motion must be suppressed before actual selection is indicated.

Fortunately, force samples that represent desired motion are very likely to be largely near the pointing plane in the z-R coordinate space. Further, since z and R values are already available as part of selection signature discovery, it is a straightforward matter to compare z with R during periods of relatively rapidly increasing z and suppress motion unless R exceeds z.

Figure 14:
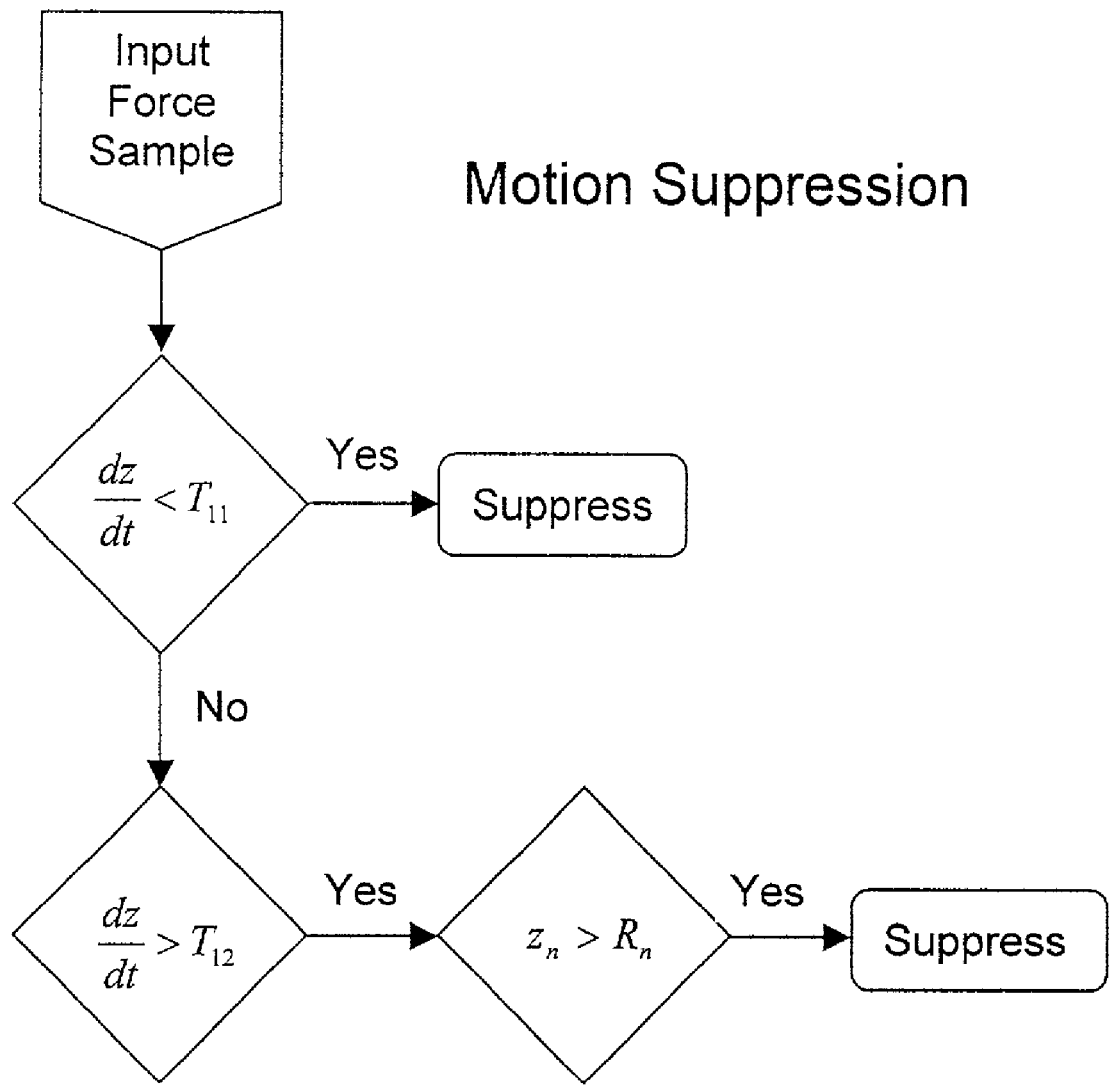
FIG. 14 is a flow chart illustrating how motion is suppressed in accordance with an embodiment of the present invention.

The motion suppression procedure is illustrated in FIG. 14. All force samples are examined for possible suppression before they are passed through the ballistics subsystem to form operating system motion reports. First, samples that occur during periods of relatively rapidly decreasing z, $$\frac{dz}{dt} < T_{11},$$

are suppressed. Second, samples that occur during periods of relatively rapidly increasing z, $$\frac{dz}{dt} > T_{12},$$

and that are largely vertical, $Z_n > R_n$, are suppressed. All motion that is not suppressed is allowed.

Preferred Embodiment

A sample rate, force sensitivity, and maximum force applicable to using an isometric joystick for pointing on a laptop computer are shown in Table 21.

TABLE 1

| Parameter | Preferred Value |
| --- | --- |
| Δ | 80 samples/sec |
| F | 0.8 grams/count |
| $F_{max}$ | ±511 counts (~400 grams) |

Given an input dynamic range of ±511 counts, a function for generating a normalized S curve is:

$$S(x) = \frac{1 - \cos\left(\frac{\pi x}{512}\right)}{2}. \quad (21)$$

Overall, G, and high, H, gains appropriate for use in equation 19 are summarized in Table 2. An appropriate threshold ($T_1$) for applying asymmetric gain is also shown in the table.

TABLE 2

| Parameter | Preferred Value |
| --- | --- |
| G | 1.5/256 |
| H | 16 |
| $T_1$ | 0 |

A method for approximating $$\frac{dz}{dt}$$

is to maintain a slowly moving average (Za) of z:

$$Za_n = \frac{(k-l) \cdot Za_{n-1} + l \cdot z_n}{k}, \quad (22)$$

and then obtain $$\frac{dz}{dt}$$

as the difference between the current z value and the slowly moving average:

$$\frac{dz}{dt} = z_n - Za_n.$$

(23)

Values of k (number of samples in the moving average) and l (weight of a current z in the moving average) that are applicable to approximating $$\frac{dz}{dt}$$

in selection, deselection and tap signatures are eight and one respectively.

Figure 10:
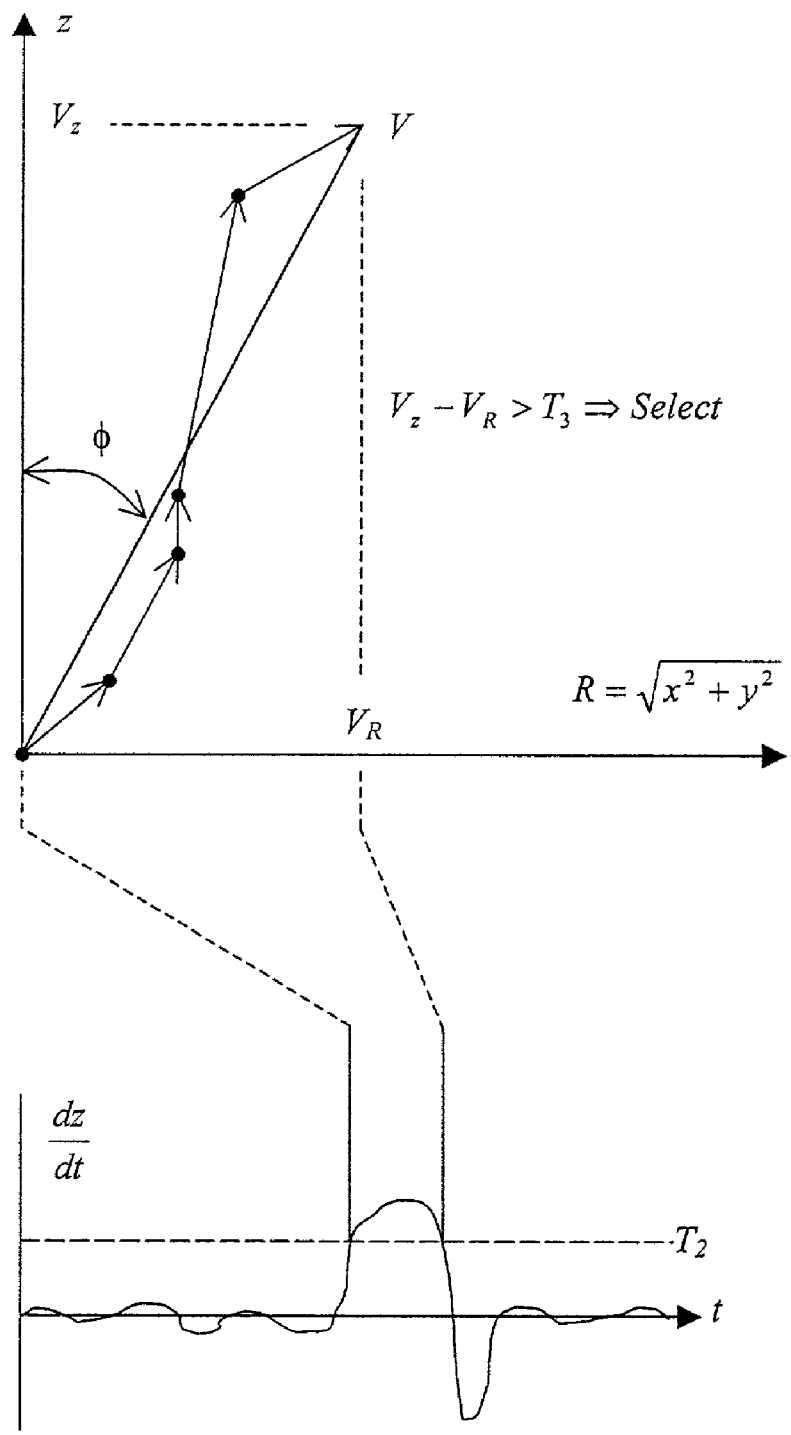
FIG. 10 is a diagrammatic illustration of a selection signature according to an embodiment of the present invention.

A useful maximum z force, $Z_{max}$, for performing selection is 400 grams. Typical threshold values for use with the selection, deselection and tap signatures of FIG. 10, FIG. 12, and FIG. 13 are shown in Table 3. Threshold values for suppressing motion as described in FIG. 14 are also shown in the table.

TABLE 3

| Threshold | Preferred Value |
| --- | --- |
| $T_2$ | $.1Z_{max}$ |
| $T_3$ | $Z_{max}$ |
| $T_4$ | $-.25z$ |
| $T_5$ | $.03F_{max}$ |
| $T_6$ | $z + .05Z_{max}$ |
| $T_7$ | $.1Z_{max}$ |
| $T_8$ | $-.25z$ |
| $T_9$ | 175ms |
| $T_{10}$ | 17 mickeys |
| $T_{11}$ | $-.1Z_{max}$ |
| $T_{12}$ | $.1Z_{max}$ |

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, reading force values and identifying force components, calculating force accumulations, integrals, and derivatives, applying gains, recognizing thresholds, selections, and tap selections, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States:

1. A method of indicating selection, based on a force applied to a pointing device, comprising:
    determining a period of relatively increasing vertical component of said force;
    accumulating a magnitude of said vertical component of said force over said period;
    accumulating a magnitude of a pointing component of said force over said period;
    comparing said accumulation of said magnitude of said vertical component of said force to said accumulation of said magnitude of said pointing component of said force; and
    determining that said magnitude of said vertical component of said force exceeds said magnitude of said pointing component of said force by a predetermined threshold.

2. The method according to claim 1 wherein a selection sensitivity is adjustable by adjusting a value of said predetermined threshold.

3. A method of maintaining selection based on a force applied to a pointing device in which said selection is maintained if a vertical component of said force does not decrease relatively quickly, the vertical component of said force does not fall below a first minimum threshold, and a magnitude of a pointing component of said force does not full below a second minimum threshold.

4. A method of indicating a short duration selection operation based on a force applied to a pointing device, comprising:
    determining that a rate of increase of a vertical component of the applied force has exceeded a first threshold,
    determining that the vertical component of said applied force has exceeded a second threshold,
    determining that a rate of decrease of the vertical component of said applied force has exceeded a third threshold,
    determining that said rate of decrease occurred within a certain time interval following occurrence of said rate of increase, and
    determining that an accumulation, over a period subtended by said rates of increase and decrease, of a magnitude of a pointing component of said applied force does not exceed a fourth threshold.

5. A method of indicating cursor motion from force applied to a pointing device, comprising:
    determining if a vertical component of the force is decreasing;
    indicating a low cursor motion speed if the vertical component of the force is determined to be decreasing;
    determining if the vertical component of the force is increasing and exceeding a magnitude of a pointing component of the force;
    indicating a low cursor motion speed if the vertical component of the force is determined to be increasing and exceeding the magnitude of the pointing component of the force; and
    relating cursor motion to the pointing component of the force if the vertical component of the force is not decreasing, and relating cursor motion to the pointing component of the force if the vertical component of the force is not increasing and not exceeding a magnitude of a pointing component of the force.

6. A method of indicating motion, on a display, of an object from force inputs applied to an input device, comprising:
    retrieving force inputs from the input device;
    applying the retrieved force inputs to a dual gain transfer function to produce a motion signal, wherein said dual gain transfer function comprises $$M_n = L \cdot F_n + H \cdot S(F_n) \cdot F_n;$$

and
    applying the motion signal to indicate motion for the object.

7. The method according to claim 6, wherein said input device is a pointing device and said object is a cursor.

8. The method according to claim 6, wherein applying the retrieved force inputs comprises applying a pointing component of the retrieved force inputs to said dual gain transfer function to produce said motion signal.

9. The method according to claim 6, wherein a first derivative of said dual-gain transfer function is continuous.

10. The method according to claim 6, wherein said $M_n$ is an amount of movement, said L is a first gain, said H is a second gain, said $F_n$ is a force, and said $S(F_n)$ is an S-curve function of $F_n$.

11. A method of indicating cursor motion from force applied to a pointing device, comprising:
    generating a force signal from said force applied to said pointing device;
    applying a first non-zero gain to said force signal;
    applying a fraction of a second gain to said force signal, wherein said faction of a second gain is a monotonically increasing function of a magnitude of said force signal, and wherein said second gain is applied only when said magnitude of said force signal is substantially non-decreasing; and indicating motion of said cursor based on the force signal to which said first and second gain have been applied.

12. The method according to claim 11, wherein said force signal is a pointing component of the force applied to said pointing device.

13. The method according to claim 11, wherein said second gain is higher than said first gain.

14. The method according to claim 11 in which said monotonically increasing function increases smoothly.

15. A method of indicating selection based on a force applied to a pointing device, comprising:

recognizing a period of relatively increasing selection force on said pointing device in which an accumulation of the selection force exceeds an accumulation of a magnitude of a pointing force on said pointing device by a predetermined threshold; and indicating a selection based on the recognized period.

16. The method according to claim 15, wherein said selection force is a vertical force on said pointing device.

17. The method according to claim 15, wherein said pointing force comprises a force applied in a substantially orthogonal direction to said selection force on said pointing device.

18. The method according to claim 15, wherein said pointing force comprises a horizontal force applied to the pointing device.

19. The method according to claim 15 wherein a selection sensitivity is adjustable by adjusting the predetermined threshold.

20. A method of maintaining a selection of a pointing device, comprising:

determining a selection component and a pointing component of a force applied to said pointing device; and maintaining a current selection if the selection component of said force does not decrease more than a variable rate, a magnitude of the selection component of the force does not fall below a first minimum threshold, and a magnitude of the pointing component of the force does not fall below a second minimum threshold.

21. The method according to claim 20, wherein said selection component is a vertical component of said force.

22. The method according to claim 20, wherein said variable rate is approximately one quarter of the selection component of said force.

23. The method according to claim 20, wherein said minimum threshold comprises approximately 0.03 of a maximum applied force.

24. A method of indicating a short duration selection operation based on a force applied to a pointing device, comprising:

determining that a rate of increase of a selection component of said applied force has exceeded a first threshold;

determining tat the selection component of said applied force has exceeded a second threshold;

determining that a rate of decrease of the selection component of said applied force has exceeded a third threshold;

determining that said rate of decease occurred within a predetermined time interval;

determining that an accumulation, over a period subtended by said rates of increase and decrease, of a magnitude of the pointing component of said applied force does not exceed a fourth threshold; and indicating a short duration selection.

25. The method according to claim 24, wherein said short duration selection is a click.

26. A method of indicating motion of an object from a force applied to a pointing device, comprising:

indicating an application of motion to said object according to a pointing component of the applied force;

indicating a reduction of motion to said object when a selection component of the applied force is decreasing at a rate faster than a predetermined decrease rate; and indicating an application of motion to said object when a selection component of the applied force is increasing at a rate greater than a predetermined increase rate and exceeding a magnitude of the pointing component of the applied force.

27. The method according to claim 26, wherein said object is a cursor.

28. The method according to claim 26, wherein said indication of reduced motion comprises setting a velocity of the object to zero.

29. The method according to claim 26, wherein said selection component is a vertical component of the applied force.

30. The method according to claim 26, wherein said selection component is in a first direction and said pointing component is in a plane perpendicular to said first direction.

31. A method of indicating movement from a pointing device, comprising:

retrieving a force signal from the pointing device;

applying a dual gain transfer function having a continuous first derivative to a pointing component of the retrieved force signal to produce a motion signal; and applying the motion signal to indicate motion of a cursor;

wherein applying the dual gain transfer function comprises:

applying a first non-zero gain to said pointing component, and applying, only if a magnitude of the pointing component is non-decreasing, a factional part of a second gain, which is higher than said first gain, to said pointing component wherein said fractional part of the second gain is based on a smoothly increasing monotonic function of said magnitude of the pointing component.

32. A method of indicating selection based on a force applied to a pointing device, comprising:

determining a selection component and a pointing component of the force applied to said pointing device;

recognizing a period of relatively increasing selection component on said pointing device in which an accumulation of the selection component exceeds an integral of a magnitude of the pointing component applied on said pointing device by a predetermined selection threshold; and determining a selection based on the recognized period; and maintaining a current selection if the selection component of said force does not decrease more than a predetermined rate, the selection component of the force does not fall below a first minimum threshold, and a magnitude of the pointing component of the force does not fall below a second minimum threshold.

33. A method of determining an amount of pointer movement for a pointer, from a force applied to a pointing device, comprising:

assigning a minimum resolvable force to a fraction of a minimum amount of pointer movement; and accumulating a plurality of fractions of the minimum amount of pointer movement, wherein an amount of pointer movement is related to a pointing component of the applied force according to a dual-gain transfer function, and wherein accumulating a plurality of fractions further comprises accumulating a plurality of fractions of the minimum amount of pointer movement until a sum of the plurality of fractions of the minimum amount of pointer movement totals at least an integral number.

34. The method of claim 33 wherein the amount of pointer movement for a pointer on a display is a function of the accumulated plurality of factions of the minimum amount of pointer movement.

35. The method of claim 33 further comprising:

reporting as an integral number the sum of the fractions of the minimum amount of pointer movement.

36. The method of claim 35 whereby the integral number reported is the greatest integral number available from the sum of plurality of fractions of the minimum amount of pointer movement.

37. The method of claim 35 further comprising:

retaining any residual fraction of the minimum amount of pointer movement that is greater than the integral number reported.

38. The method of claim 37 further comprising:

relating the integral number reported to the amount of pointer movement for a pointer on a display.

39. A method of indicating cursor motion from force applied to a pointing device wherein the indicated cursor motion is related to a pointing component of the applied force according to a dual-gain transfer function, said dual-gain transfer function comprising an S-shaped integral blend, and wherein a first derivative of said dual-gain transfer function is continuous, and wherein the first derivative of said dual-gain transfer function is a monotonically increasing function that increases smoothly.

40. A method of indicating cursor motion from force applied to a pointing device wherein the indicated cursor motion is related to a pointing component of the applied force according to a dual-gain transfer function comprising an S-shaped multiplicative blend, and wherein a first derivative of said dual-gain transfer function is continuous, and wherein said dual-gain transfer function includes a first relatively lower gain, a second relatively higher gain, and wherein said second relatively higher gain is applied only when a magnitude of a pointing component of the force applied is substantially non-decreasing.

41. A method of indicating cursor motion from force applied to a pointing device wherein the indicated cursor motion is related to a pointing component of the applied force according to a dual-gain transfer function, said dual-gain transfer function consisting of a first linear segment having a first derivative and a second linear segment having a second derivative larger than the first derivative, and wherein said first linear segment and said second linear segment meet at a transition point.

42. A method of indicating cursor motion from force applied to a pointing device wherein the indicated cursor motion is related to a pointing component of the applied force according to a first transfer function when a magnitude of the pointing component is substantially non-decreasing, and according to a second transfer function when the magnitude of the pointing component is decreasing.

43. The method according to claim 42 wherein a first derivative of first transfer function is continuous.

44. The method according to claim 42 wherein said first transfer function increases smoothly.

45. The method according to claim 42 wherein the first transfer function comprises a dual-gain transfer function, said dual-gain transfer function comprising blend of a first relatively lower gain and a second relatively higher gain.

46. The method according to claim 45 wherein said second transfer function consists essentially of said first relatively lower gain.

47. The method according to claim 46 wherein said relatively lower gain comprises a constant gain.

48. A method of indicating cursor motion from force applied to a pointing device wherein the indicated cursor motion is related to a, pointing component of the applied force according to a dual-gain transfer function, said dual-gain transfer function comprising a blend of a first blending function, said dual-gain transfer function having a smoothness such that a first derivative of said dual gain transfer function is continuous and monotonically increasing and a second derivative of said dual gain transfer function is continuous.

49. A method of indicating cursor motion from force applied to a pointing device wherein the indicated cursor motion is related to a pointing component of the applied force according to a dual-gain transfer function, said dual-gain transfer function having a continuous fist derivative and wherein said first derivative is non-increasing at a point of maximum input force.

50. A method of indicating selection, based on a force applied to a pointing device, comprising:

determining a period of relatively increasing vertical component of said force;

accumulating a difference between a magnitude of said vertical component of said force and a magnitude of a pointing component of said force over said period; and indicating selection responsive to said accumulated difference between the magnitude of said vertical component of said force and the magnitude of a pointing component of said force exceeding a predetermined threshold.

51. A method of indicating cursor motion from force applied to a pointing device comprising:

determining if a vertical component of the force is not decreasing;

determining if the vertical component of the force is not exceeding the magnitude of a pointing component of the force;

relating cursor motion to a pointing component of the force via a dual-gain transfer function if said vertical component of the force is not decreasing and if said vertical component of the force is not exceeding the magnitude of a pointing component of the force; and relating cursor motion to a pointing component of the force via a relatively lower gain transfer function if said vertical component of the force is decreasing or if said vertical component of the force is not exceeding the magnitude of a pointing component.

52. A method of indicating selection based on a force applied to a pointing device, comprising:

determining a selection component and a pointing component of the force applied to said pointing device;

recognizing a period of relatively increasing selection component in which an accumulation of the selection component exceeds an accumulation of a magnitude of the pointing component by a predetermined selection threshold; and determining a selection based on the recognized period; and maintaining a current selection if the selection component does not decrease faster than a predetermined rate, and the selection component does not full below a first minimum threshold.

* * * * *